…

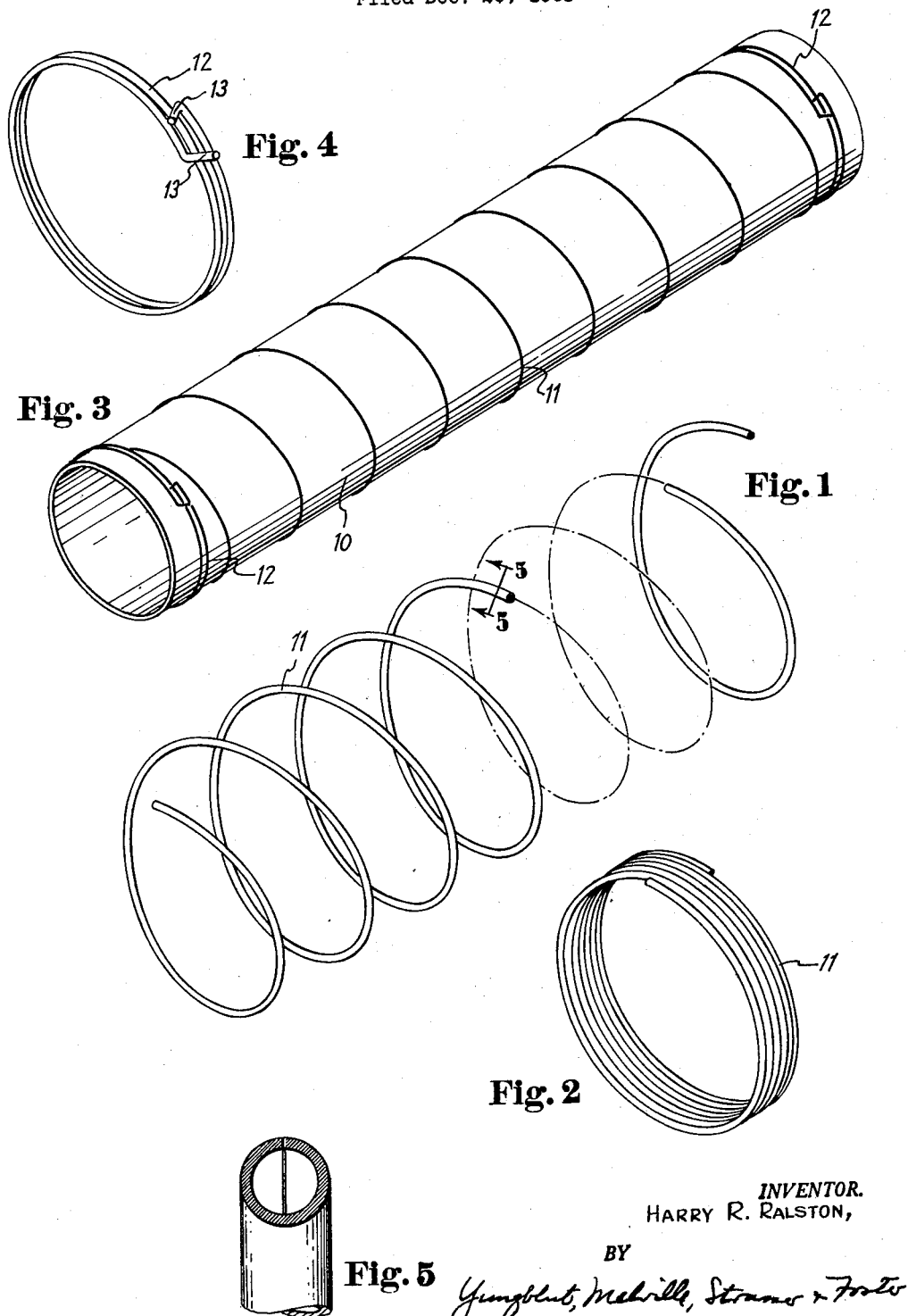

United States Patent Office 3,141,480
Patented July 21, 1964

3,141,480
REINFORCED PIPE
Harry R. Ralston, Albuquerque, N. Mex., assignor to Armco Steel Corporation, Middletown, Ohio, a corporation of Ohio
Filed Dec. 26, 1961, Ser. No. 162,020
3 Claims. (Cl. 138—172)

This invention relates to underground pipe which is intended to be laid in the ground in a trench which is then back-filled with earth and wherein the back-fill is compacted. More particularly, the invention relates to a pipe for the use described above which will have a relatively thin wall and may be made of a material more expensive than that customarily used for such pipe. The wall thickness will be such that the pipe is capable of withstanding the load to which it will be subjected in situ but which will be too thin to stand directional forces to which it may be subjected in handling, in transit and in installation and the subsequent back-filling and compacting operations.

When pipe is handled in transit from the factory to the warehouse or to the job site and when the pipe is handled at the site in connection with emplacement in a trench and during the operations of back-filling and compacting the back-fill, it is subjected to numerous external directional loads which tends to distort the pipe from its circular cross-section or which will tend to flatten, bend or dent the pipe.

After the pipe has been installed in the ground and back-filling and compacting of the back-fill has been properly carried out, the pipe is subjected to what is known as non-directional ring compression loading. A pipe of relatively thin wall thickness or a pipe of plastic, for example, is capable of substantially uniform omni-directional ring compression, but a pipe which will be set in situ may not be capable of standing up under the uni-directional external forces to which it is subjected prior to completion of the job, and before the soil settles.

In connection with underground pipe installations, it is highly desirable to have the pipe of corrosion resistant material and this desired quality could be obtained with various plastics or with stainless steel. However, if the pipe is to be made of one of these more expensive materials, in a wall thickness such that it is capable of tolerating the directional external loads during handling, it becomes entirely too expensive to be competitive. With the foregoing considerations in mind, it is the principal object of the invention to provide a reinforced pipe for underground use wherein the pipe may be made of a relatively expensive corrosion resistant material of quite thin wall thickness, it is only necessary that the wall thickness be sufficient to withstand the expected uniform omni-directional ring compression load in situ. The reinforcement is provided only to protect the thin wall pipe during handling and installation and since the reinforcement is no longer necessary after the pipe is covered, the reinforcement may be of the cheapest sort of material which may corrode away and disappear after the pipe is in place.

It is a further object of the invention to provide a reinforced pipe as above outlined wherein the reinforcing structure is simple and inexpensive and which can be applied to the pipe after the pipe has been fabricated.

Many pipes for underground use are made of corrugated material in order to permit the use of a thinner wall section without loss of strength, but the use of corrugated pipe provides disadvantages in that the interior of the pipe is not smooth and therefore the flow characteristics are not optimum. In some cases this problem has been overcome by lining the pipe at least on the bottom with an asphaltic material which fills in the grooves of the corrugations on the inside of the pipe so as to provide a smooth wall, but this of course adds to the cost of the pipe.

It is, therefore, still another object of the invention to make it possible to use smooth wall pipe for the purposes above described.

These and other objects of the invention which will be described in greater detail hereinafter are accomplished by that certain construction and arrangement of parts of which the following describes an exemplary embodiment.

Reference is made to the drawing forming a part hereof and in which:

FIGURE 1 is a perspective view of a reinforcing member in its free state.

FIGURE 2 is a similar view of the reinforcing member in its compressed state ready to be applied to the pipe.

FIGURE 3 is a perspective view showing the reinforcing element of FIGURES 1 and 2 in place on the pipe and showing also the end reinforcement members in place.

FIGURE 4 is a perspective view of an end reinforcement member in its free state; and FIGURE 5 is a cross-sectional view on an enlarged scale through a convolution of any of the reinforcing members taken on the line 5—5 of FIGURE 1.

Briefly, in the practice of the invention, there is provided a pipe which may be smooth walled and which may be made of a plastic or of stainless steel or other relatively expensive material and having a wall thickness which is of the minimum necessary to withstand the expected uniform omni-directional ring compression load after installation. This pipe is externally reinforced with a relatively inexpensive material such as unprotected open seam tubing in the form of a compression spring which, in its free state, has an internal diameter slightly smaller than the outside diameter of the pipe and which, when compressed, has an inside diameter slightly larger than the pipe. This reinforcement is applied to the pipe by compressing the tubing coil spring and slipping it over the pipe and then permitting it to return, to the extent possible, to its free state. The pipe will then have a helical external reinforcement.

At each end the pipe may be provided with an end reinforcement comprising several tight convolutions of the same material, the ends of the convolutions overlapping so that the end reinforcement may be expanded slightly to be slipped over the pipe.

The tubing reinforcing material need not be secured to the pipe, and covers a relatively very small area of the pipe surface and it is not relied upon to take uni-directional loads. If a directional load is applied to the pipe at any point between convolutions, tending to increase the diameter of the pipe at right angles to the direction of the load this load is transmitted to the containing helix to produce a sort of composite action in resisting such directional load.

Referring now in more detail to the drawings, the pipe is indicated at 10 in FIGURE 3. The principal reinforcing member comprises the helical compression spring indicated at 11 and shown in cross-section in FIGURE 5. This member may be open seam small diameter tubing made of mild steel or similar relatively inexpensive material because after installation this tubing may corrode away without affecting the strength of the pipe in situ. The inside diameter of the helix of the member 11, when said member is in its free state, will be slightly less than the outside diameter of the pipe to which it is to be applied. By way of example, a convenient dimension is about 98% of the outside pipe diameter. Preferably, the helix is such that the spacing between convolutions is about 85% of the pipe diameter.

When the helix of FIGURE 1 is compressed to the condition of FIGURE 2, the internal diameter of the coil will be slightly larger. By way of example, it may be about 102% of the outside diameter of the pipe.

In the condition of FIGURE 2, the coil may be slipped over the pipe 10 and when it is released it will occupy the position shown in FIGURE 3. Since the pipe diameter is slightly larger than the inside diameter of the helix in its free state, the helix will very snugly embrace the pipe and the spacing between coil convolutions will be somewhat less than when the coil is in the free state. Thus, in FIGURE 3 the space between convolutions of the member 11 will be about 65% of the pipe diameter.

In many cases the above described reinforcement may be all that is necessary. However, since the ends of the pipe are perhaps more subject to damage, it is preferred to provide end reinforcing members such as shown in FIGURE 4 at 12. These members may comprise two tight convolutions of the same material as the member 11, with the ends of the convolutions providing a substantial overlap. The overlap may conveniently be about 25% of the pipe diameter and the ends of the member 12 may be bent over as at 13 so that the member 12 may be expanded by bringing the members 13 toward each other in order to slip the member 12 over the pipe.

Again the inside diameter of the member 12 in its free state will be on the order of 97% or 98% of the pipe diameter so that it will snugly embrace the pipe when in place.

It will also be clear that the member 11 may be omitted and the entire pipe reinforced with a plurality of members 12. It has been found, however, that the combination of the end members 12 with the helix 11 is highly efficient and highly desirable.

One skilled in the art will be able to determine the correct relationship between the pipe diameter and gauge and the diameter and gauge of the tubing to be used as reinforcement. By way of example, in the table below there are shown appropriate tubing diameters and gauges in relationship to a number of standard pipe diameters and gauges.

| Pipe | | Open seam tubing | |
|---|---|---|---|
| Diameter | Gauge | Diameter | Gauge |
| 10 | 24 | 3/8 | 22 |
| 12 | 24 | 1/2 | 22 |
| 15 | 22 | 5/8 | 22 |
| 18 | 22 | 3/4 | 22 |
| 21 | 20 | 7/8 | 20 |
| 24 | 20 | 1 | 18 |
| 27 | 18 | 1 | 16 |
| 30 | 18 | 1 1/4 | 18 |
| 36 | 16 | 1 1/2 | 16 |
| 42 | 16 | 1 3/4 | 16 |
| 48 | 14 | 2 1/4 | 16 |
| 54 | 14 | 2 3/8 | 14 |
| 60 | 12 | 2 3/4 | 14 |

It will be understood that various modifications may be made without departing from the spirit of the invention and, therefore, no limitation is intended other than those appearing in the claims.

What is claimed is:

1. A reinforced metallic pipe consisting essentially of a smooth wall pipe having an outside diameter of from 10 to 60 inches and a gauge from 24 for 10 inch pipe to a gauge of 12 for 60 inch pipe, which pipe, while essentially rigid, will flex and distort during handling and placement, said pipe being reinforced externally by a helical member having an internal diameter in its free state slightly less than the outside diameter of said pipe, and having an internal diameter in a compressed state slightly larger than the outside diameter of said pipe, whereby it may be slipped over the pipe in a compressed state and then released to snugly embrace the pipe over substantially its entire length, the spacing between the convolutions of said helical member when released to embrace said pipe being on the order of 65% of the pipe outside diameter, said helical member being formed from metallic tubing having an outside diameter of from about 3/8 inch to 2 3/4 inches, the diameter of the tubing increasing in proportion to the diameter of the pipe.

2. The reinforced metallic pipe claimed in claim 1 wherein said helical member is constituted of open-seam metallic tubing.

3. The reinforced metallic pipe claimed in claim 1 including a reinforcing coil of at least two closely spaced turns surrounding each end of said pipe, said reinforcing coils in their free state having an internal diameter slightly smaller than the outside diameter of said pipe, and being expandable to an internal diameter slightly larger than the outside diameter of said pipe, whereby said coils may be expanded and slipped over the pipe ends and then released to snugly embrace said pipe ends.

References Cited in the file of this patent

UNITED STATES PATENTS

| | | |
|---|---|---|
| 325,591 | Coultaus | Sept. 1, 1885 |
| 726,730 | McGuire | Apr. 28, 1903 |
| 1,819,175 | James | Aug. 18, 1931 |
| 1,925,231 | Bundy | Sept. 5, 1933 |
| 2,147,494 | Miller | Feb. 14, 1939 |
| 2,236,107 | Miller et al. | May 25, 1941 |
| 2,687,329 | Hunter | Aug. 24, 1954 |
| 2,732,861 | Gilmore | Jan. 31, 1956 |

FOREIGN PATENTS

| | | |
|---|---|---|
| 710,271 | France | June 1, 1931 |
| 191,049 | Germany | Nov. 16, 1907 |
| 918,080 | Germany | Sept. 16, 1954 |
| 95,532 | Sweden | Apr. 25, 1939 |